INVENTORS.
RICHARD A. KROEGER,
FRED L. HELTSLEY,
MORRIS R. SMITH
BY Harry A. Herbert Jr.
Ardew Tashjian
ATTORNEYS Jan. 5, 1971  R. A. KROEGER ET AL  3,552,202
WIND TUNNEL FOR VTOL STOL AIRCRAFT MODELS
Filed Nov. 13, 1968  3 Sheets-Sheet 3
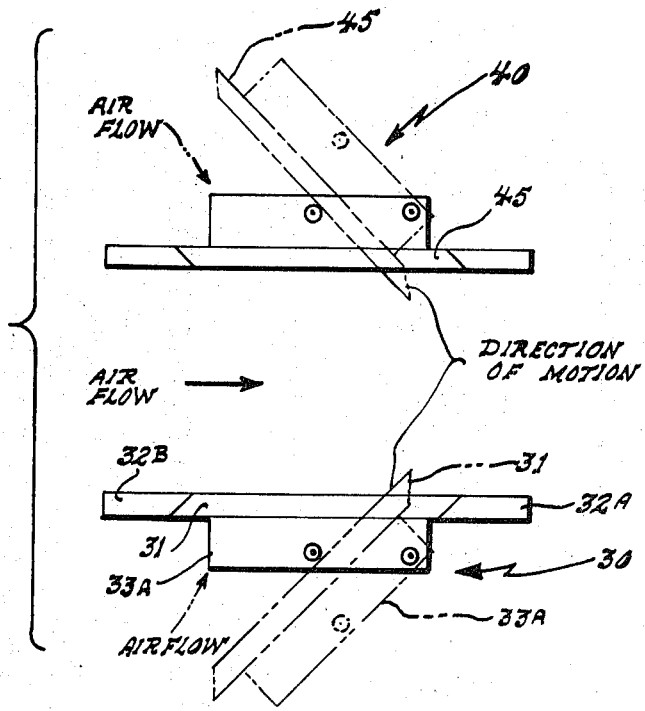
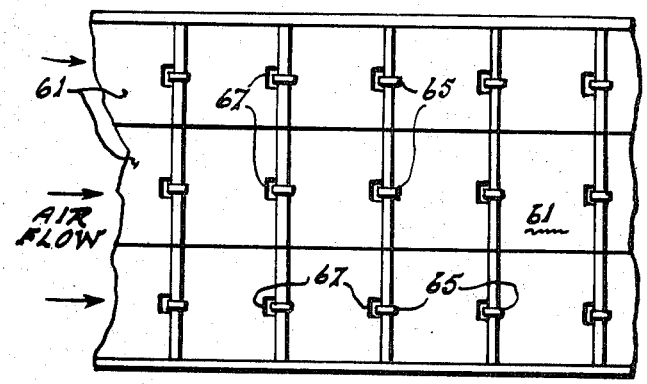
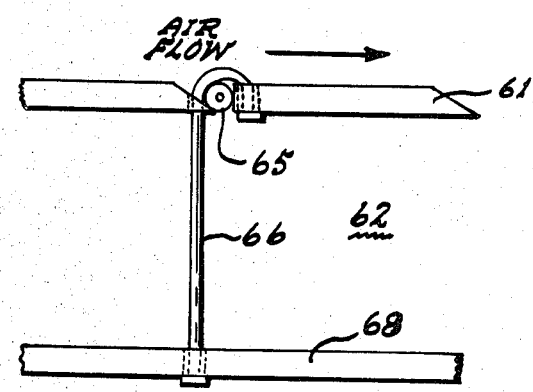
INVENTORS
RICHARD A. KROEGER,
FRED L. HELTSLEY,
BY MORRIS R. SMITH
Harry A. Herbert Jr.
Andrew Tashjian and
ATTORNEYS 3,552,202
WINDTUNNEL FOR VTOL AND STOL
AIRCRAFT MODELS
Richard A. Kroeger and Fred L. Heltsley, Tullahoma, Tenn., and Morris R. Smith, Birmingham, Ala., assignors to the United States of America as represented by the Secretary of the Air Force
Filed Nov. 13, 1968, Ser. No. 775,391
Int. Cl. G01m 9/00
U.S. Cl. 73—147                                  3 Claims

ABSTRACT OF THE DISCLOSURE

An apparatus for achieving interference-free velocity distribution in the planes of the walls of a subsonic wind tunnel for testing models of aerodynamic vehicles which induce large flow distortions near the walls. Sets of adjustable louvers make up the test section walls and extend both upstream and downstream of the model to be tested. The louvers open into the static pressure region of the environment outside the wind tunnel. The floor, starting beneath the model and extending downstream, is comprised of a series of flapper vanes which open into a plenum chamber which is at an adjustable pressure level. This serves to scavenge and exhaust the downward air and jet from the model. The adjustability of the wall louvers, coupled with the adjustable pressure scavenging system, permits very close and continuous matching of the desired streamlines. When the louvers and scavenge vanes are closed the wind tunnel operates as a conventional wind tunnel.

BACKGROUND OF THE INVENTION

This invention relates to subsonic wind tunnels and, more particularly, to an apparatus for attaining interference-free velocity distribution of air at and near the walls of the test chamber of the wind tunnel.

The state-of-the-art pertaining to wind tunnels has progressed rapidly from the subsonic type, to the transonic type, to the supersonic type, to the hypersonic type, and to the hypervelocity type. However, with the need for, and resultant interest in, high performance winged airborne vehicles which can take off and land either vertically or within short lengths, or both, at relatively very low speeds and, additionally, hover, there exists a requirement for a subsonic wind tunnel appropriate for testing models of such vehicles. As can be appreciated, the problems of control and stability of these type vehicles at low speed are severe.

As a matter of convenience, these vehicles will be referred to, hereinafter as "V/STOL," an art-accepted designation meaning "Vertical or Short Take-Off and Landing," and include, but are not limited to, such types as: (1) the tilt-wing type; and (2) the swing-out lift engine type.

The obvious complexity of the aerodynamic interaction between a "V/STOL" model and plane wind tunnel walls makes current state-of-the-art subsonic type wind tunnels unsatisfactory for testing such models. As a result, model test data obtained by the use of such subsonic wind tunnels are of questionable value, at best. More specifically and more accurately, only specialized cases lend themselves to adequate data interpretation.

The basic subsonic wind tunnel is an open circuit one, i.e., "Eiffel" type. Our invention, as a matter of convenience, but not of limitation, will be described hereinafter as applied to such a basic wind tunnel. It is to be noted and assumed that the wind tunnel includes, but is not limited to, the entrance, the nozzle section, the throat section including air pervious honeycomb partitions at either end and the test chamber therebetween, the diffuser section, a fan for drawing and expelling air, means for activating and deactivating the fan, the discharge or exit, and associated components, including instruments or instrumentation: (1) for measuring or sensing the velocities, the pressures and the temperatures of the air at one or more places in the tunnel; and (2) for measuring or sensing the surface pressures, forces, movements, and changes of airstream in connection with the model being tested.

In the case where this invention is used with a closed return or "conventional" wind tunnel, a special "plenum" or pressure chamber surrounding the test section may be necessary to satisfy certain pressure conditions.

In essence, this invention permits the accurate testing of "V/STOL" models in subsonic type tunnels and, thereby, fills a critical current need and advances the state-of-the-art.

SUMMARY OF THE INVENTION

This invention provides for improvements in subsonic wind tunnels, so that models of "V/STOL" type vehicles may be tested in an air velocity distribution environment corresponding to the anticipated interference-free condition of actual flight.

Therefore, an object of this invention is to improve, by modification, and at minimum cost, existing subsonic wind tunnels, particularly of but not limited to, the open circuit type, to permit the accurate testing of models of "V/STOL" type vehicles.

Another object is to permit testing of models at much lower wind speeds than is possible in present solid wall subsonic tunnels.

Still another object is to provide an apparatus for obtaining interference-free velocity distribution at or near the wind tunnel walls.

A further object is to provide an apparatus for converting the solid walls of the test chamber to ventilated ones.

A still further object is to provide an apparatus for scavenging of the exhaust jet, other than, and in addition to, the exit of the wind tunnel.

These, and still other, objects of the invention will become readily apparent after a consideration of the description of the invention and reference to the drawings.

DESCRIPTION OF THE DRAWINGS

FIG. 4 is a plan view, in transverse cross-section, of a louver in the forward side wall of the test chamber, and of a louver in the rear side wall of the test chamber, showing in phantom how they move and are adjustable;

FIG. 5 is a plan view of the scavenging system in the floor of the test chamber; and FIG. 6 is a side view, in detail, of a single flapper vane, and associated components, of the floor scavenging system of the test chamber.

DESCRIPTION OF A PREFERRED EMBODIMENT

Figure 1:
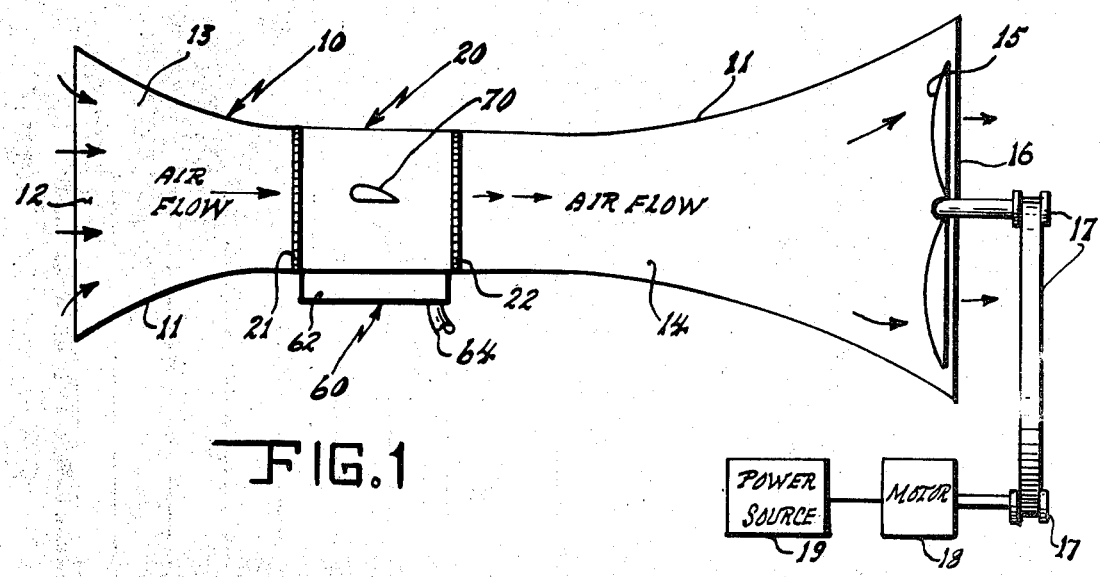
FIG. 1 is a longitudinal cross-sectional view, in schematic form, of an Eiffel type subsonic wind tunnel embodying our invention.

In FIG. 1 is shown in schematic form a longitudinal cross-section of an open circuit, i.e., Eiffel, type subsonic wind tunnel which incorporates our invention. This type of wind tunnel includes, with reference to FIG. 1, the wind tunnel proper 10 with walls 11, entrance 12, nozzle section 13, throat section or test chamber 20 defined at each end by air pervious honeycomb partitions 21 and 22, diffuser section 14, fan 15 (or, as appropriate, a propeller), exit 16, means 17 to link fan 15 to a means for activating and deactivating fan 15, such as motor 18 with power source 19.

As schematically shown, model 70 is mounted or otherwise placed in the throat section or test chamber 20 for testing.

The air flow is, as indicated, from left to right or, more accurately, from entrance 12 to exit 16.

Figure 2:
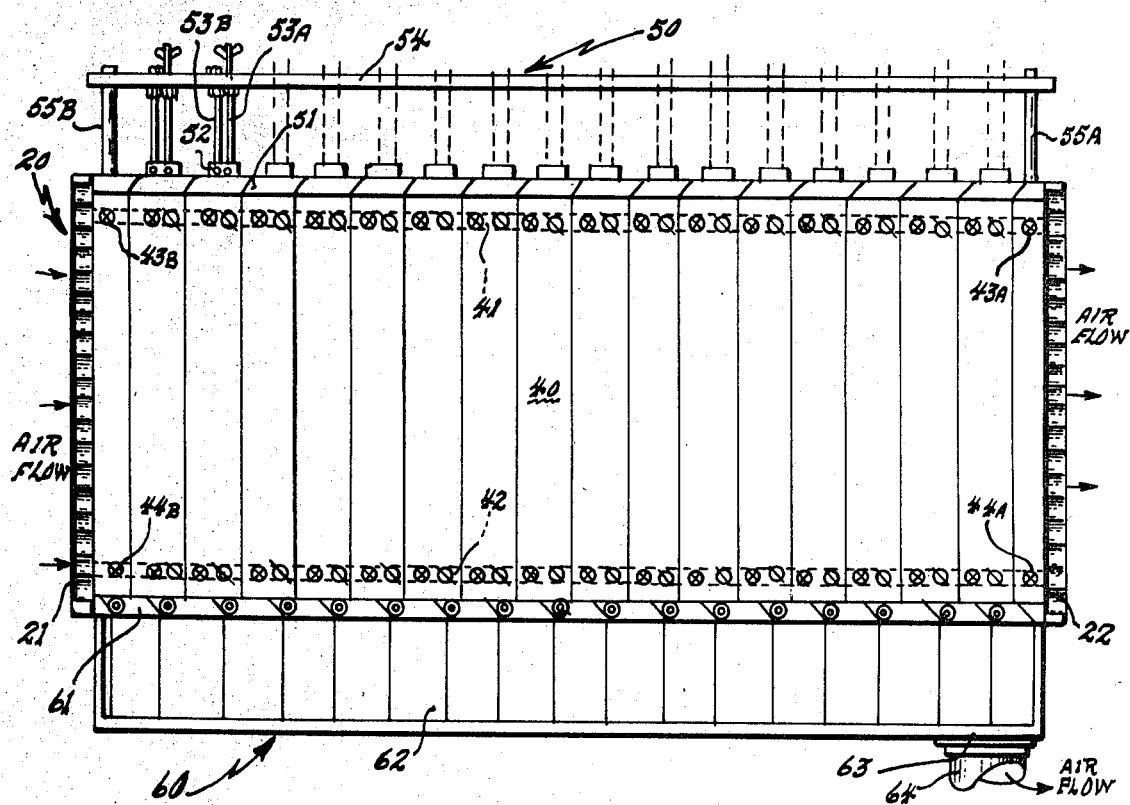
FIG. 2 is a longitudinal cross-sectional view, in schematic form, of the test chamber shown in FIG. 1 and embodying our invention.

In FIG. 2, a longitudinal cross-section of throat section or test chamber 20, the air flow is, as indicated, from left to right. Test chamber 20 is, in effect, a hollow rectangle with the forward side wall (i.e. facing the reader and shown in part as 30, FIG. 3), the rear side wall 40, and the top wall 50, all of which are louvered. The bottom wall or floor (FIGS. 2, 5 and 6) is louvered, but also has a scavenging system 60, including flapper type vanes 61 (FIGS. 2, 5 and 7).

Although the term "wall" is used, the "wall" is actually an assembly, or combination, of parts; and, therefore, is more appropriately referable as a "wall assembly" and, hereinafter, when applicable, will be so denoted.

The hollow rectangular test chamber 20 has air pervious honeycomb partitions 21 and 22, FIG. 2, at each end.

The louvered wall assemblies (such as 40 and 50, FIG. 2, and 30, FIG. 3) include, as components, individual louvers, such as 51 in FIG. 2, to which is affixed a linking member, such as 52, at each end of each louver. Rotatably pinned to each linking member, such as 52, are two adjustable, e.g., threaded, rods, such as 53A and 53B, which pass through suitably disposed openings (not shown) in crossbars, such as 54. For each louvered wall assembly (such as 40 and 50, FIG. 2, and 30, FIG. 3), there are at least two crossbars, such as 54, each of which is parallel to each other, such as crossbars 41 and 42, and to the longitudinal axis of test chamber 20. These crossbars are affixed at each end to perpendicular supports, such as 55A and 55B (and 43A and 43B; and 44A and 44B).

Figure 3:
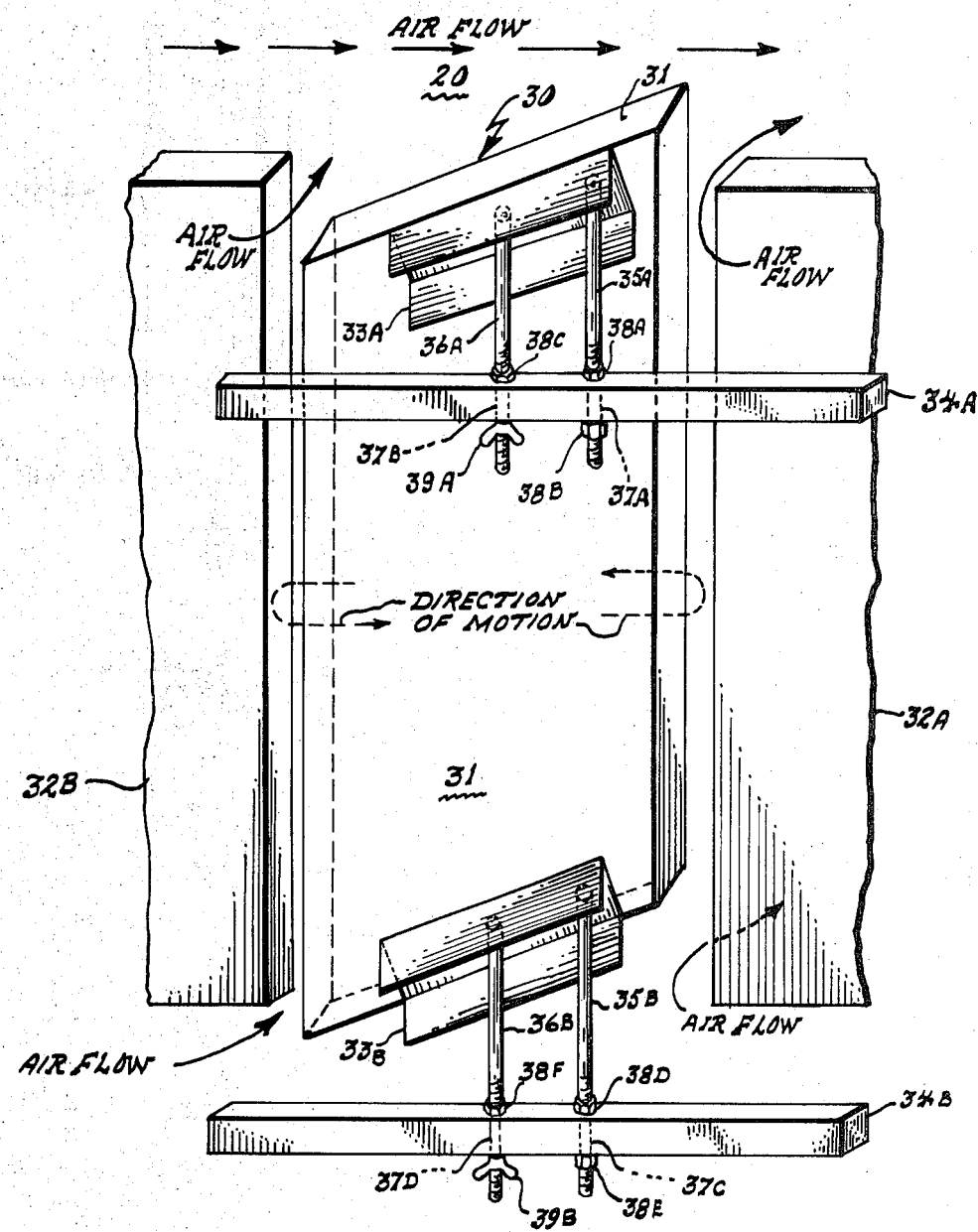
FIG. 3 is a front view, partially in isometric, of the detail of one louver of the forward side wall of the wind tunnel test chamber.

The specific structure and movement of each individual louver can more readily be understood and followed by reference to FIG. 3. Therein is depicted a louver 31, and associated components, of front side wall assembly 30. It is here to be noted that the individual louvers, when in a closed, i.e. flat, position, present an apparently solid wall. Referring again to FIG. 3, louver 31 is adjacent to, and abuts with, louver 32A on one side and 32B on the other. Linking members 33A and 33B are affixed to louver 31. Crossbars 34A and 34B are parallel to each other, and to the longitudinal axis of test chamber 20, and are equidistant from louver 31 when it is in a level mode, i.e., closed or flat. Adjustable, e.g., threaded, rods 35A and 35B are pivotably pinned to linking member 33A; and adjustable, e.g., threaded, rods 36A and 36B are pivotably pinned to linking member 33B. Adjustable, e.g., threaded, rods 35A, 35B, 36A and 36B pass through suitably disposed openings 37A, 37B, 37C and 37D, in crossbars 34A and 34B which, in turn, are mounted on and affixed to vertical supports (not shown). Adjustable, e.g., threaded, rods 35A, 35B, 36A and 36B are individually adjustable by movement of the appropriate adjustable retaining means, such as nuts 38A, 38B, 38C, 38D, 38E and 38F and winged nuts 39A and 39B, so that the individual louver 31 not only can be opened, but also can be twisted and held. All other louvers are similarly structured.

With reference to FIG. 4, and the plan view in transverse cross-section depicted therein, in phantom is shown how opposite individual louvers 31 and 41 are movable and how, in a closed mode, i.e., flat position each, such as 31, form a solid wall with the abutting adjacent louvers, such as 32A and 32B. The louvers are made of a deformable, preferably elastic, material so that they may be twisted, that is, the winged nut 39A may be set different from winged nut 39B. More than two crossbars (34A and 34B) may be used to provide adjustment for the louvers.

It is here noted as a related matter, that the louvered wall assemblies 30, 40 and 50 which constitute three of the four walls of test chamber 20 are about eight chord lengths both upstream and downstream of model 70.

Referring again to FIGS. 1 and 2, the bottom or floor of test chamber 20 has, as previously stated, a scavenging system 60. The system 60, as shown in FIG. 2, includes flapper vanes, such as 61, which open downwardly into adjustable pressure plenum chamber 62 which is at a different pressure, i.e., pumped slightly lower than the test chamber 20 static pressure. Plenum chamber 62 has an opening 63 to which is affixed an exhaust vent 64 which leads to the atmosphere external of wind tunnel 10.

With reference to FIG. 5, the flapper vanes, such as 61, lie in the plane of the bottom or floor of test chamber 20 and, in the absence of an impinging jet, provide an apparently solid floor.

FIG. 6, depicts in detail the structure of the flapper vane 61 and associated parts, including hinge 65 and spring means 66. Flapper vane 61, as are the other flapper vanes, is of rigid material; is movable downwardly about hinge 65 into plenum chamber 62; and is notched 67 (FIG. 5) to pass by, and move through, hinge 65 (FIGS. 5 and 6) about which the adjacent flapper vane rotates. The spring means 66 may be, simply, a rubber band of circular cross-section affixed at one end to the floor 68 of plenum chamber 62 and affixed at the other end to the bottom of flapper vane 61, after said rubber band of circular cross-section 66 has been led over hinge 65 and through the top of vane 61. The purpose of the spring or rubber band of circular cross-section 66 is to hold the flapper vane 61 in place and, after vane 61 has moved downward, to restore or return vane 61 to its original position, when there is a sufficient reduction in pressure.

MODE OF OPERATION OF THE PREFERRED EMBODIMENT

When a "V/STOL" model, such as 70, FIG. 1, is to be tested, it is mounted by suitable means in test chamber 20 of wind tunnel 10. The motor 18 is activated by power source 19 and, through linkage members 17, fan 15 is rotated. Air external to wind tunnel 10 is drawn in by rotating fan 15 through entrance 12, and passes through nozzle section 13, throat section or test chamber 20 with air pervious honeycomb partitions 21 and 22, and diffuser section 14. The air then exits through plenum chamber 62, via exhaust duct 64, and also through wind tunnel exit 16.

As has been stated previously, louvers, such as 31, FIG. 3, make up the walls of test chamber 20. These individual louvers may be, and are, adjusted to provide the local flow angularity in test chamber 20. As the air bleeds into test chamber 20, as shown for example in FIGS. 3 and 4, the pressure drop across the walls causes the correct velocity magnitude, while the direction is provided by the angle of the adjustable individual louver, such as 31, FIG. 3.

The air may bleed into test chamber 20 either from a plenum chamber (not shown) in and around test chamber 20 or, alternatively, from the atmosphere of the environment in which the wind tunnel 10 is located. The open circuit type, i.e., Eiffel, of wind tunnel, such as 10, eliminates the need for a plenum chamber (not shown), since the static pressure outside wind tunnel 10 is adequate for providing the flow velocities required in matching interference-free velocity field at tunnel walls 11 and, more specifically, wall assemblies (such as 40 and 50, FIG. 2, and 30, FIG. 3) of test chamber 20.

The pressure field inside test chamber 20 is developed, automatically so to speak, by model 70 being tested.

On the other hand, the settings of the louvers, such as 31, FIG. 3, are determined by analytical calculations or by experimental measurements, to continuously match the desired streamlines. The individual louvers are adjusted or set, both in angularity and in twist, simply by moving opposite nuts, such as 38A and 38B of FIG. 3, on individual threaded rods, such as 35A of FIG. 3, and by moving nut and opposite wing nut, such as 38C and 39A of FIG. 3, on individual threaded rods, such as 36A of FIG. 3. Since this action adjusts or sets only one end of each louver, such as 31 of FIG. 3, and further since adjustment or setting of the other end of the louver may be desirable or necessary, similar action is taken at the other end of the louver.

The scavenging system 60, FIGS. 1 and 2, has, as previously stated, flapper vanes, such as 61, FIGS. 2, 5 and 6, which are movable downwardly into plenum chamber 62, FIGS. 1, 2 and 6. The flapper vanes, such as 61, FIGS. 2, 5 and 6, are under, and downstream of, the model 70 being tested; and, such vanes are opened by the force of the jet of fan 15, FIG. 1, and by the pressure difference between test chamber 20, FIGS. 1 and 2, and the scavenging plenum 62, FIGS. 1, 2 and 6. Thus, the plenum pressure may be adjusted until the amount of air exhausted by the flapper vanes, such as 61, FIGS. 2, 5 and 6 approaches the amount introduced by the louvers, such as 31, FIG. 3. Because of spring or rubber band of circular cross-section 66, FIGS. 5 and 6, the individual flapper vane 61 is restorable or returnable to its original position with sufficient reduction in pressure. In summary, the scavenging system 60 provides for the elimination of the high intensity flow disturbances generated by the spreading of the impinging exhaust jet throughout test chamber 20.

While there has been shown and described the fundamental novel features of our invention, as applied to the preferred embodiment, it is to be understood that various substitutions and omissions may be made by those skilled in the art, without departing from the spirit of the invention. For example: louvered wall assemblies (such as 40 and 50, FIG. 2, and 30, FIG. 3) could open into a plenum chamber at pressure equal to the total head of the tunnel flow.

What is claimed is:

1. A test chamber for a subsonic wind tunnel, comprising:
    (a) means for ventilating the test chamber through the walls thereof, wherein said means includes louvers adjustable for angularity and for twist; and
    (b) means for exhausting air through the floor of the test chamber.

2. The apparatus, as set forth in claim 1, wherein the means for exhausting air through the floor of the test chamber includes:
    (a) a plurality of pressure sensitive movable vanes lying in the plane of the floor of the test chamber;
    (b) a plenum chamber, at an adjustable pressure different than the test chamber static pressure, to which said pressure sensitive movable vanes duct the air to be exhausted; and
    (c) an exhaust vent leading from said plenum chamber into the atmosphere external to the wind tunnel.

3. The apparatus, as defined in claim 1, wherein the louvers adjustable for angularity and for twist, include:
    (a) at least one linking member affixed to each end of each louver on the surface external to the test chamber;
    (b) at least two crossbars, external to the test chamber, parallel to each other and to the longitudinal axis of the test chamber, disposed opposite to said linking members, and having openings therein parallel to the surface of said louver;
    (c) at least two rods, external to the test chamber, each adjustable at one end, and at the other end pivotably pinned to one said linking member, and passing through an opening of a crossbar, and having thereon at said adjustable portion movable adjustable retaining means disposed on either side of said crossbar;
    (d) at least two rods, external to the test chamber, each adjustable at one end, and at the other end pivotably pinned to another said linking member, and passing through said openings of another said crossbar, and having thereon at said adjustable portion movable adjustable retaining means disposed on either side of said crossbar; and
    (e) support bars, external to the test chamber, positioned between and affixed to the external surface of the wind tunnel and the ends of each said crossbar.

References Cited

FOREIGN PATENTS 770,840    3/1957    Great Britain _____ 73—147
619,250    3/1949    Great Britain _____ 73—147

S. CLEMENT SWISHER, Primary Examiner